Figure 1:
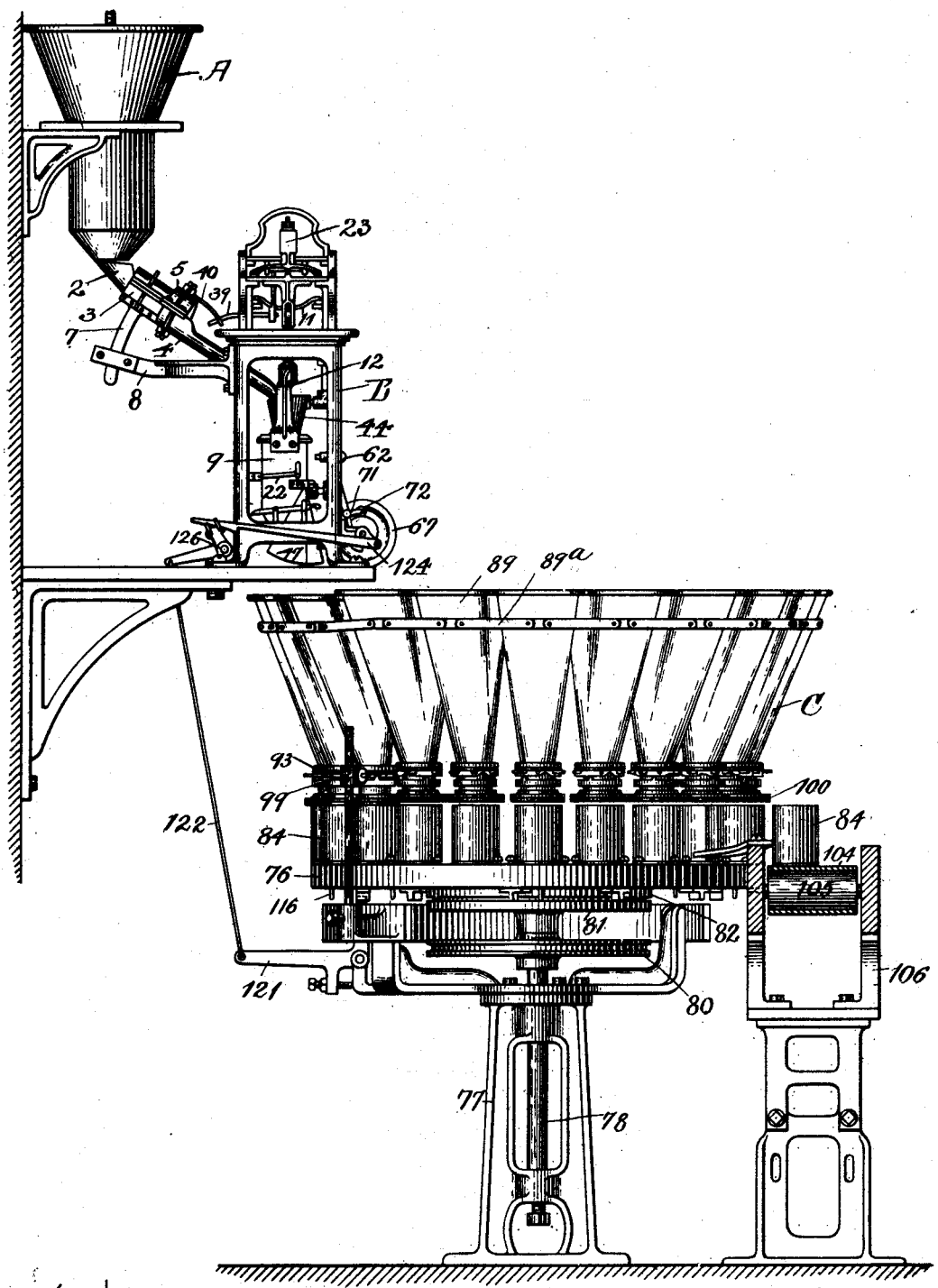

No. 667,560. Patented Feb. 5, 1901.
W. E. NICKERSON.
AUTOMATIC WEIGHING APPARATUS.
(Application filed Jan. 6, 1899.)
(No Model.) 11 Sheets—Sheet 1.

WITNESSES:
INVENTOR:
William E. Nickerson,
By E. D. Chadwick,
Attorney.

No. 667,560.  
W. E. NICKERSON.  
AUTOMATIC WEIGHING APPARATUS.  
(Application filed Jan. 6, 1899.)

(No Model.)

Patented Feb. 5, 1901.

11 Sheets—Sheet 4.

WITNESSES:  
E. B. Tomlinson.  
Benj Manning.

INVENTOR:  
William E. Nickerson,  
By E. D. Chadwick,  
Attorney.

No. 667,560. Patented Feb. 5, 1901.
W. E. NICKERSON.
AUTOMATIC WEIGHING APPARATUS.
(Application filed Jan. 6, 1899.)
(No Model.) 11 Sheets—Sheet 5.
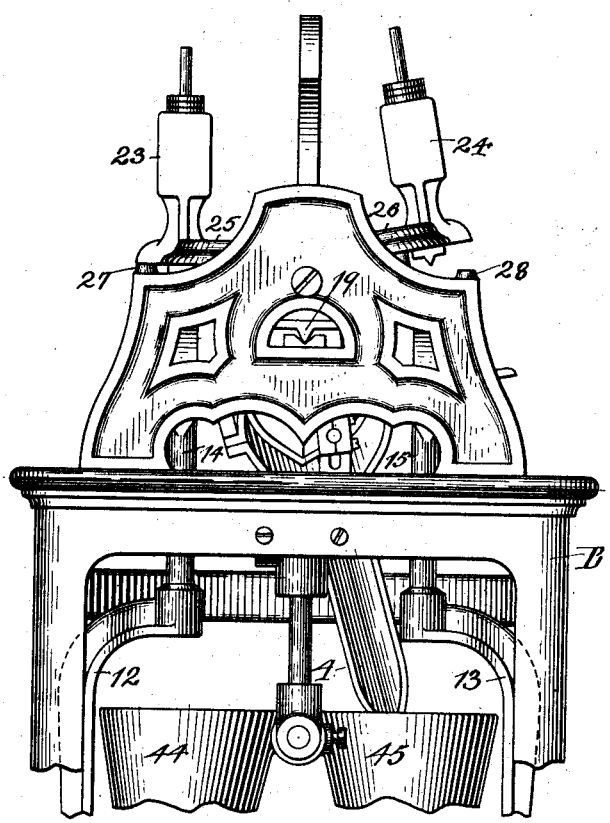
Fig. 5.
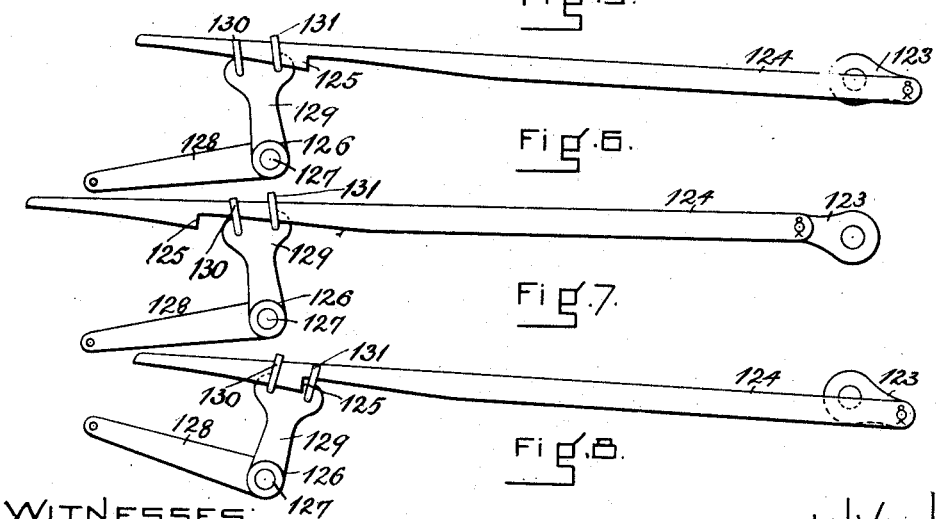
Fig. 6.
Fig. 7.
Fig. 8.
WITNESSES:
E. B. Tomlinson.
Benj Manning
INVENTOR
William E. Nickerson,
By E. D. Chadwick,
Attorney.
THE NORRIS PETERS CO., PHOTO-LITHO., WASHINGTON, D. C.

No. 667,560. Patented Feb. 5, 1901.
W. E. NICKERSON.
AUTOMATIC WEIGHING APPARATUS.
(Application filed Jan. 6, 1899.)
(No Model.) 11 Sheets—Sheet 6.

WITNESSES: INVENTOR:
E. B. Tomlinson. William E. Nickerson,
Benj Manning By E. D. Chadwick,
Attorney.

No. 667,560. Patented Feb. 5, 1901.
W. E. NICKERSON.
AUTOMATIC WEIGHING APPARATUS.
(Application filed Jan. 6, 1899.)

(No Model.) 11 Sheets—Sheet 7.

WITNESSES: INVENTOR:

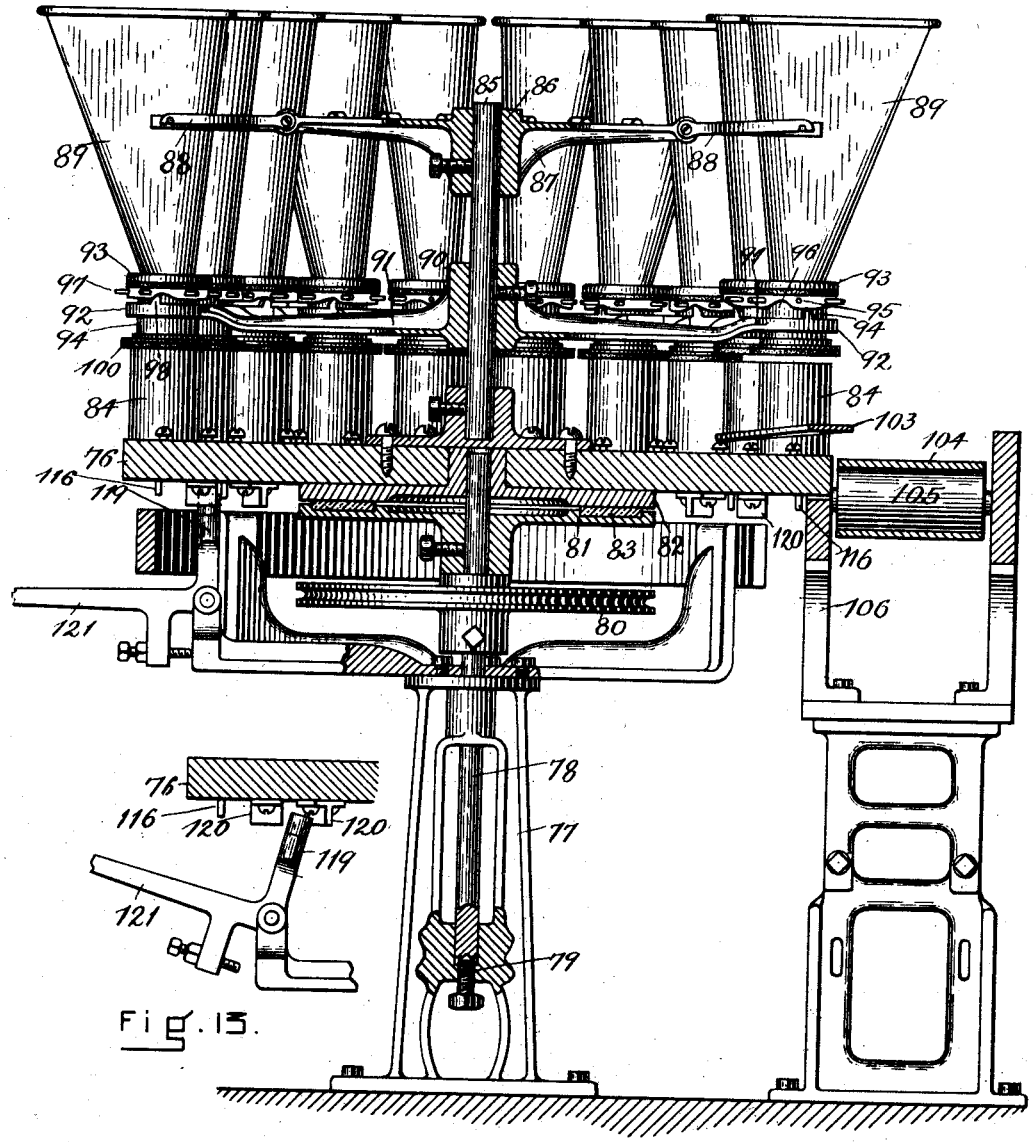

No. 667,560. Patented Feb. 5, 1901.
W. E. NICKERSON.
AUTOMATIC WEIGHING APPARATUS.
(Application filed Jan. 6, 1899.)

(No Model.) 11 Sheets—Sheet 9.

WITNESSES:
E. B. Tomlinson.
Benj. Manning.

INVENTOR:
William E. Nickerson,
By E. D. Chadwick,
Attorney.

No. 667,560. Patented Feb. 5, 1901.
W. E. NICKERSON.
AUTOMATIC WEIGHING APPARATUS.
(Application filed Jan. 6, 1899.)
(No Model.) 11 Sheets—Sheet 10.

WITNESSES:
E. B. Tomlinson.
Benj. Manning

INVENTOR:
William E. Nickerson,
By E. D. Chadwick,
Attorney.

No. 667,560. Patented Feb. 5, 1901.
W. E. NICKERSON.
AUTOMATIC WEIGHING APPARATUS.
(Application filed Jan. 6, 1899.)

(No Model.)  
11 Sheets—Sheet 11.

UNITED STATES PATENT OFFICE.

WILLIAM EMERY NICKERSON, OF CAMBRIDGE, MASSACHUSETTS, ASSIGNOR, BY MESNE ASSIGNMENTS, TO THE NEW ENGLAND AUTOMATIC WEIGHING MACHINE COMPANY, OF PORTLAND, MAINE.

AUTOMATIC WEIGHING APPARATUS.

SPECIFICATION forming part of Letters Patent No. 667,560, dated February 5, 1901.

Application filed January 6, 1899. Serial No. 701,374. (No model.)

*To all whom it may concern:*

Be it known that I, WILLIAM EMERY NICKERSON, a citizen of the United States, residing at Cambridge, in the county of Middlesex and State of Massachusetts, have invented certain new and useful Improvements in Automatic Weighing Apparatus, of which the following is a specification.

My invention relates to automatic apparatus for weighing out uniform amounts of material and introducing the same into cans or other receptacles, it being intended more particularly for use in weighing materials in powdered form—for example, starch, flour, baking-powder, &c. It has heretofore proved very difficult to weigh automatically such materials because they tend to flow unevenly, to clog and become compacted upon standing, to adhere to surfaces with which they come in contact, and to spill through slopping and blowing. My present invention is intended to overcome these difficulties and to produce a mechanism which will readily receive a powdered substance from a supply-bin, accurately and automatically weigh it into uniform lots, and introduce each lot into a can or similar receptacle. My apparatus may also include, if desired, means for settling the charges in the receptacles and conveying the latter to any desired place.

A preferred form of my invention is illustrated in the accompanying drawings, in which—

Figure 2:
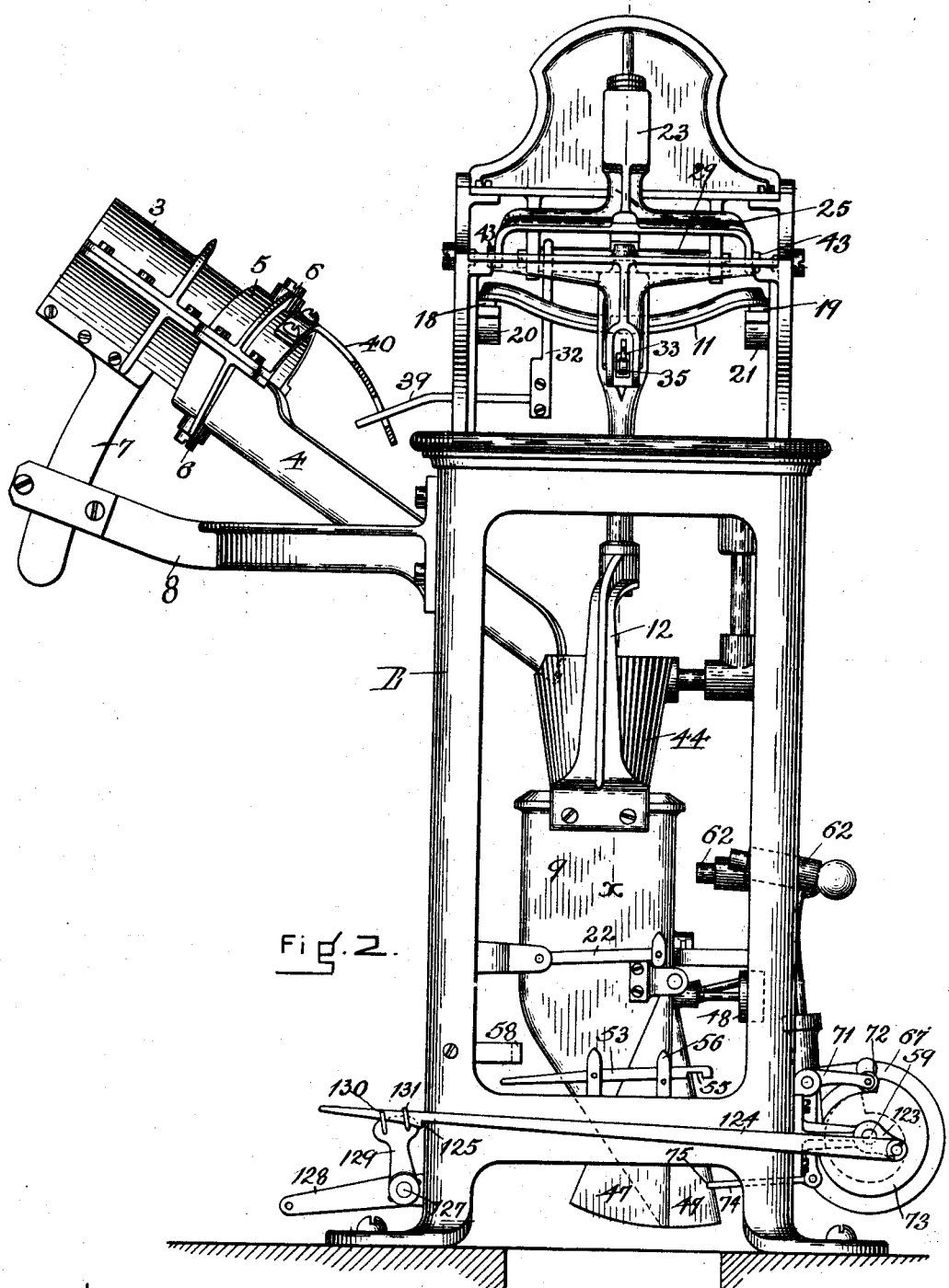
Figure 3:
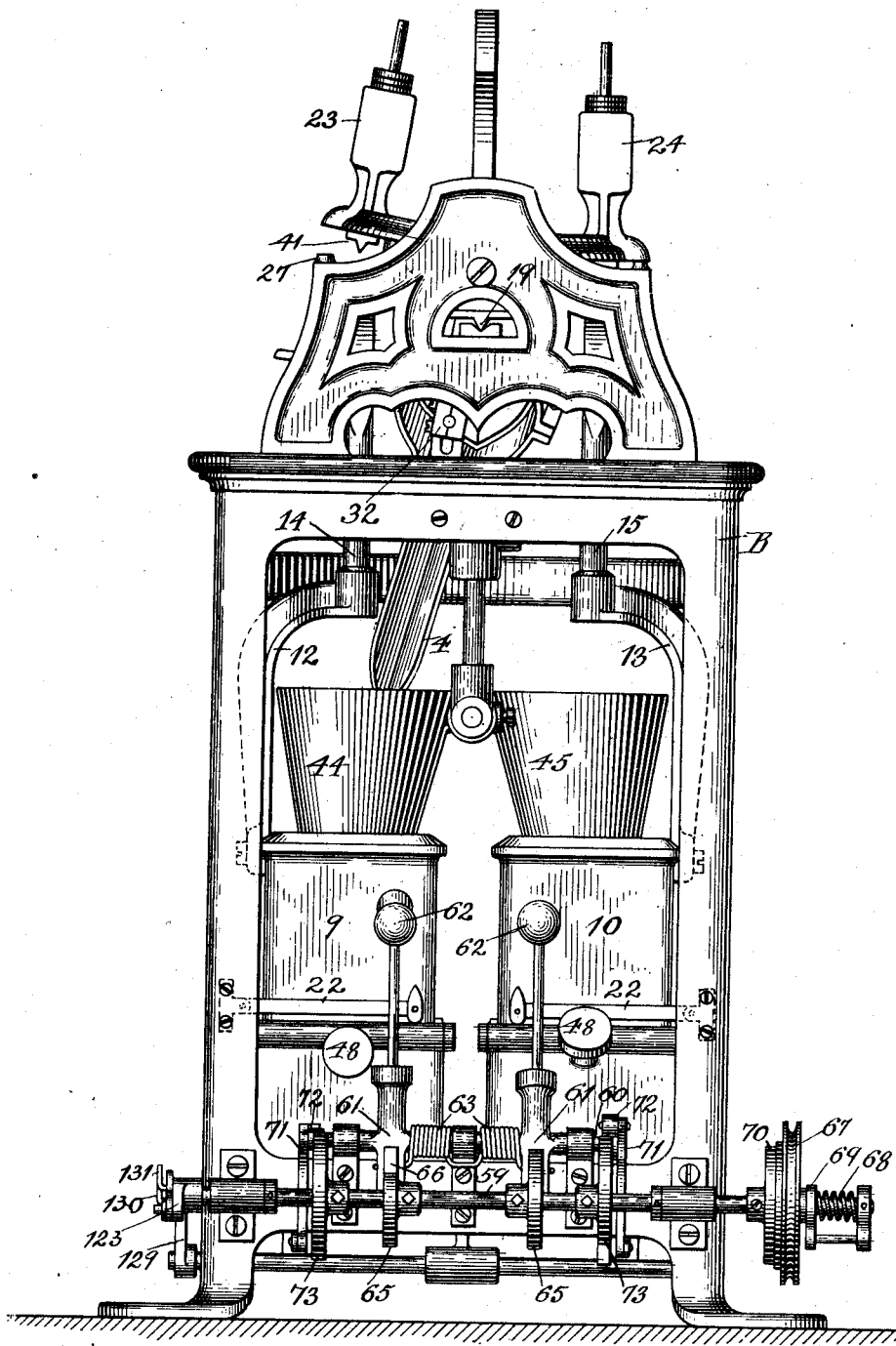
Figure 4:
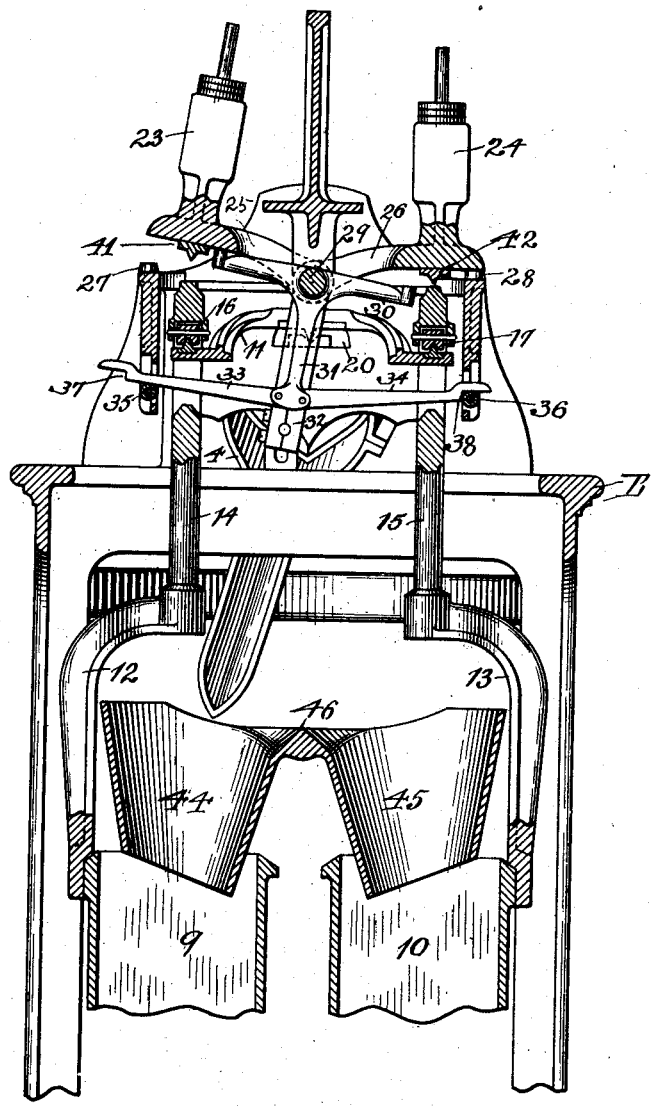
Figure 9:
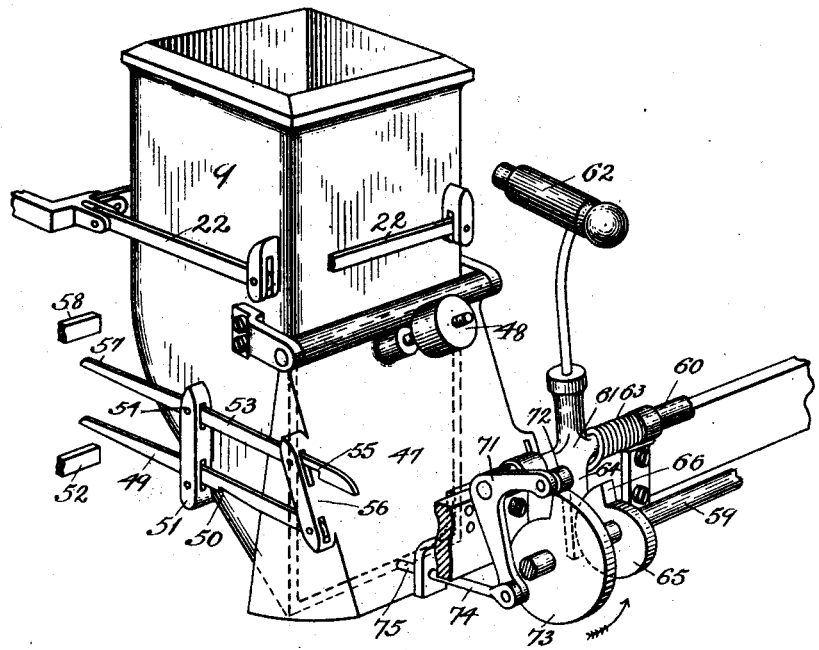
Figure 10:
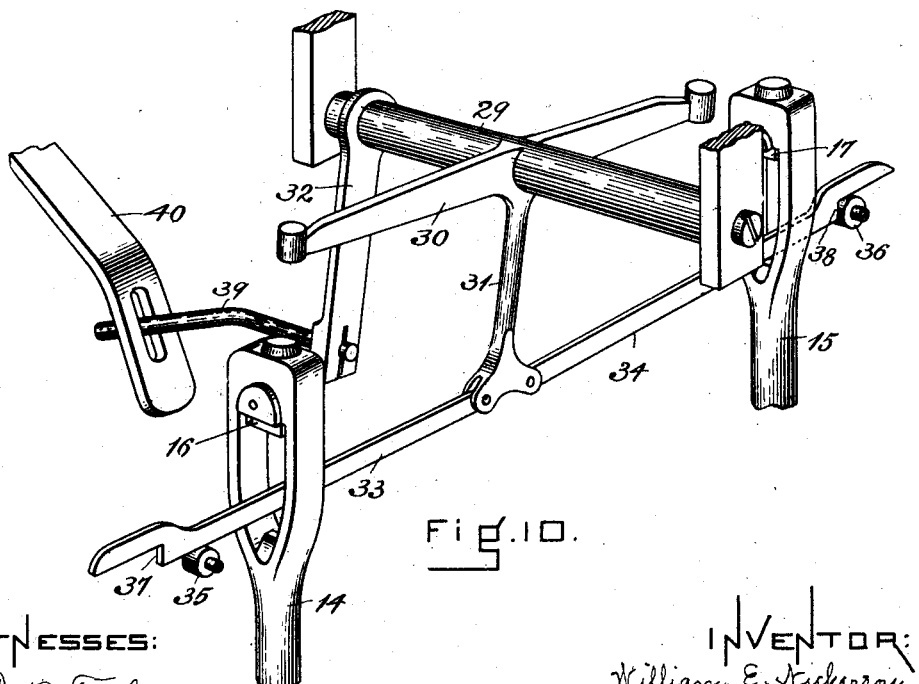
Figure 11:
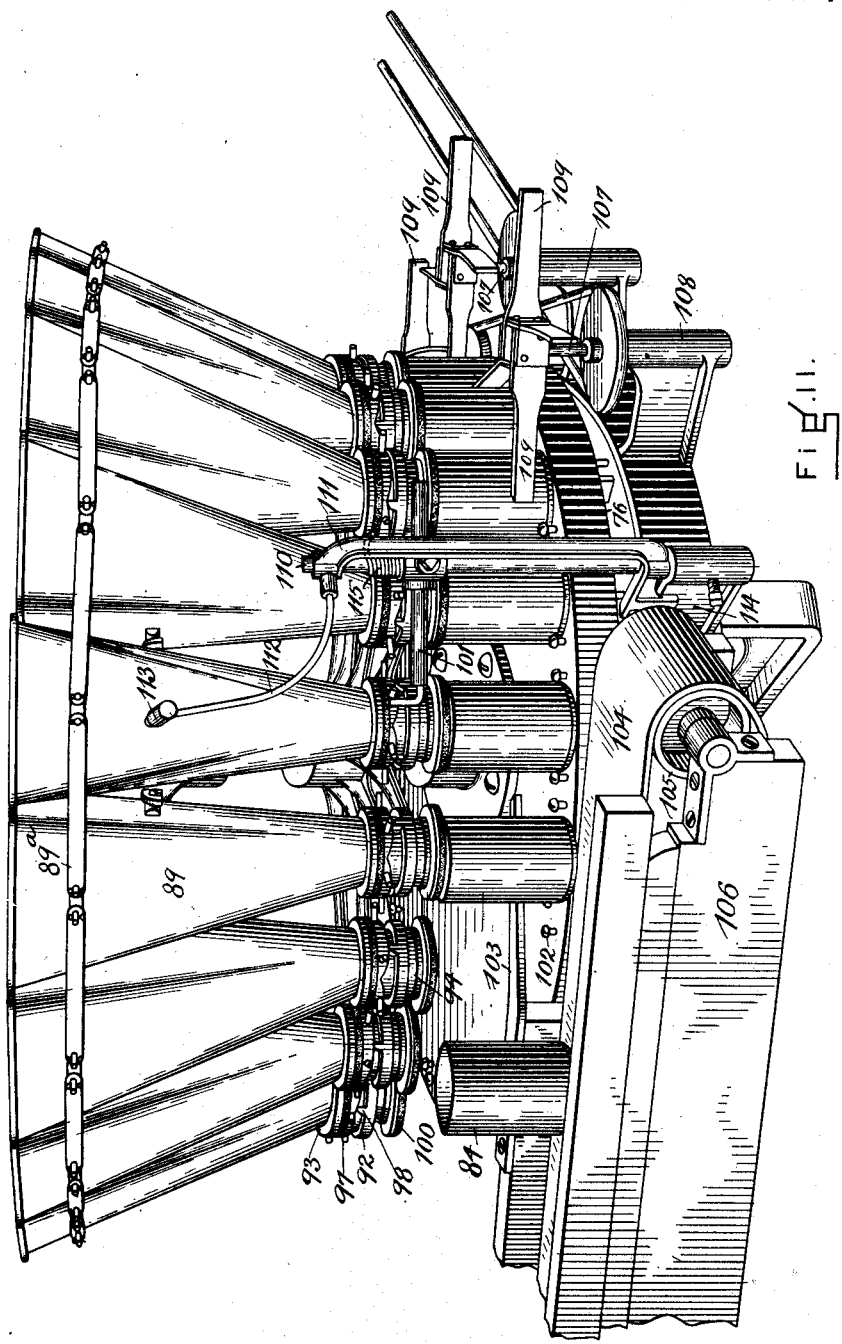
Figure 14:
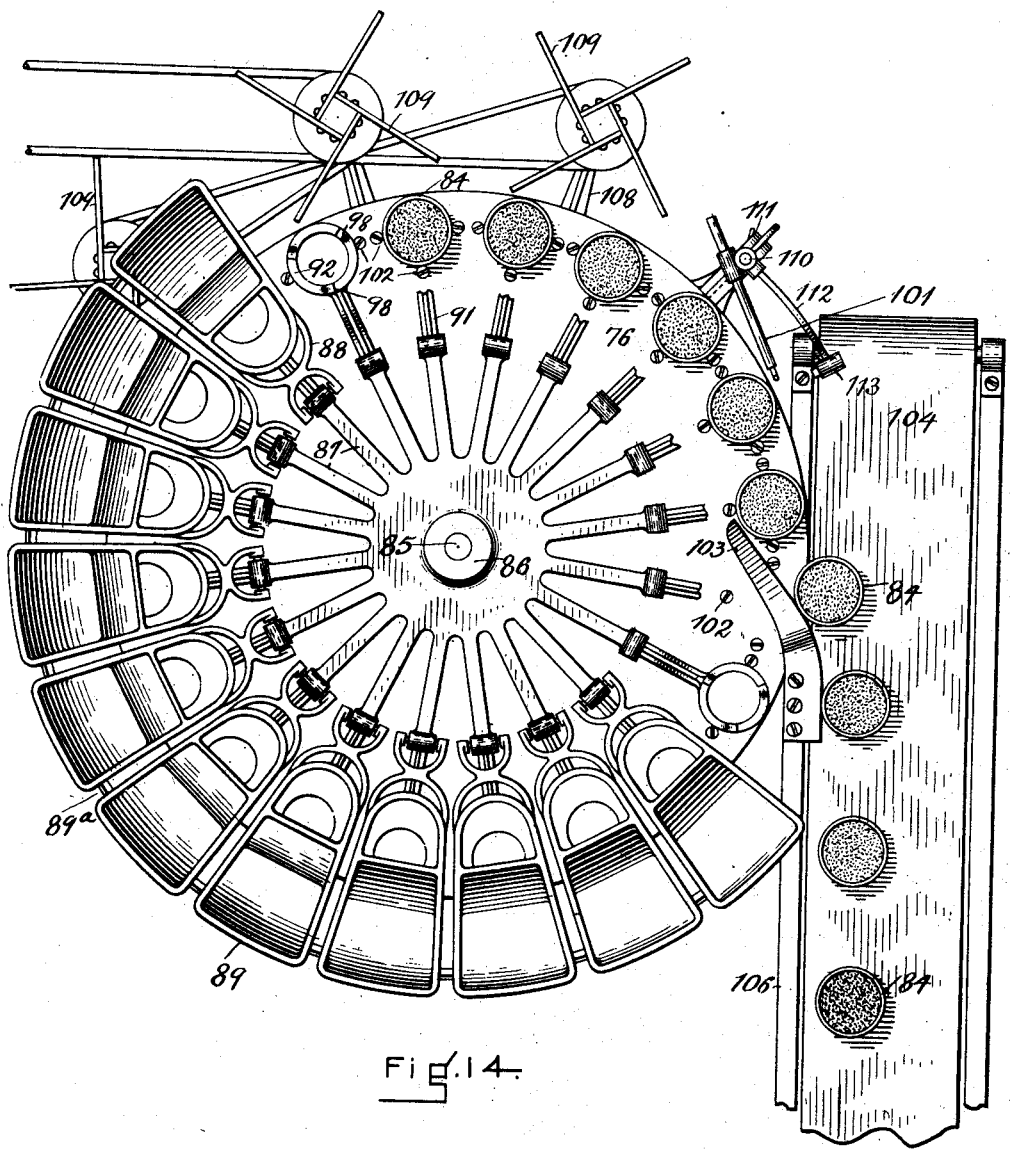
Figure 15:
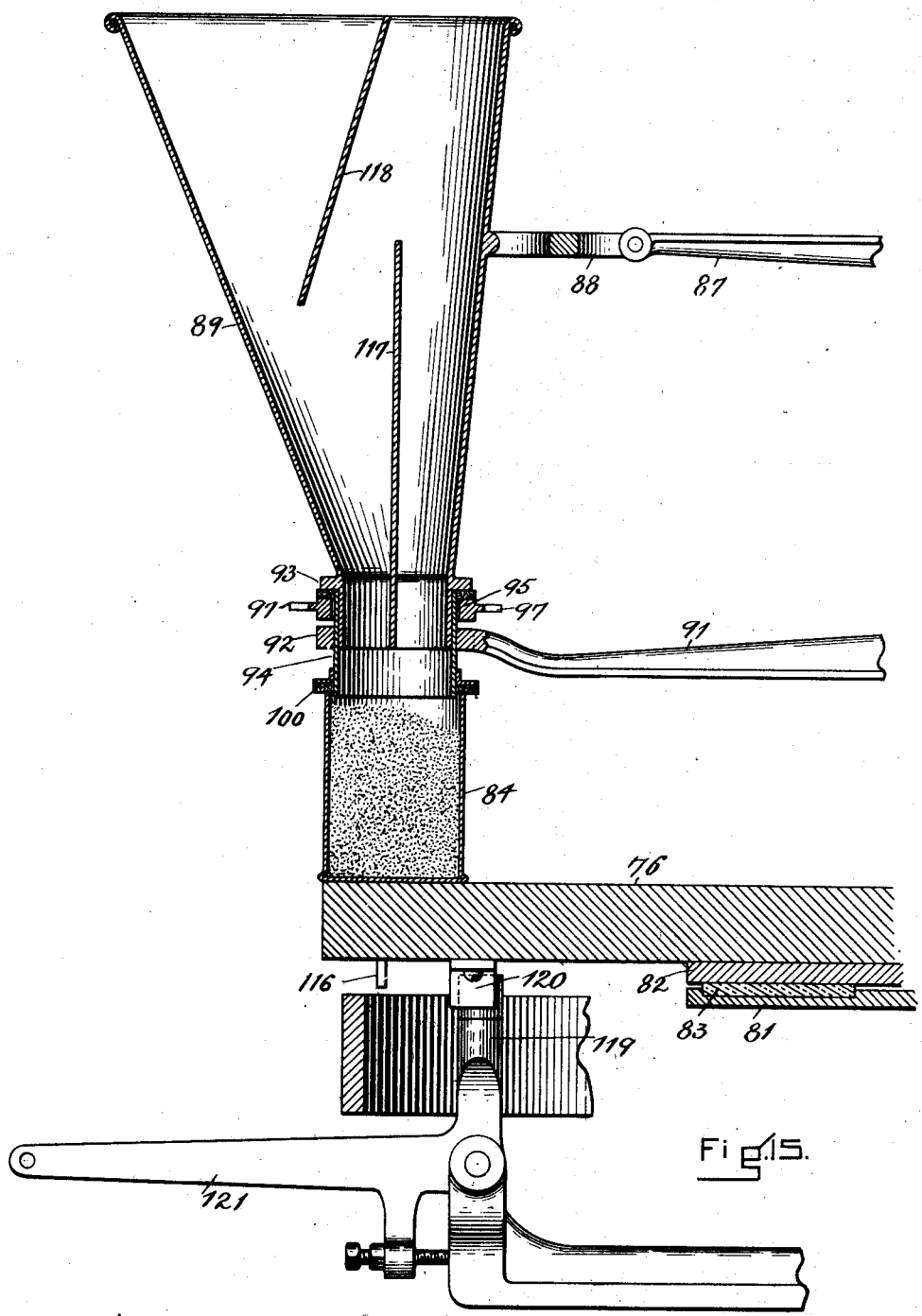
Figure 16:
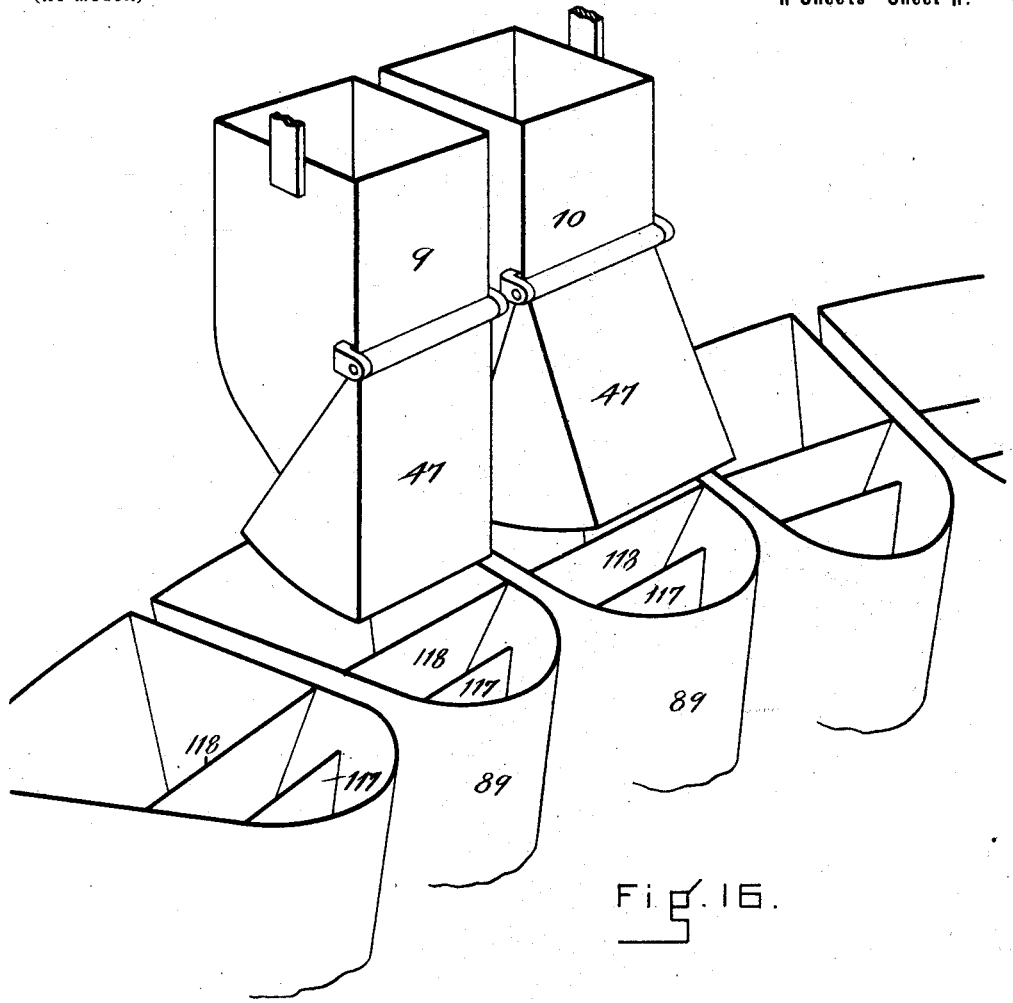
Figure 17:
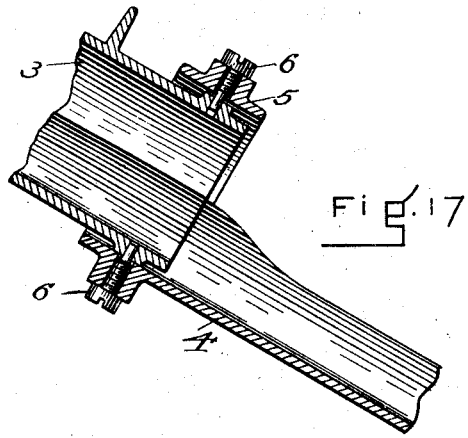

Figure 1 is a side elevation of the complete apparatus. Fig. 2 is a similar view, on an enlarged scale, of the weighing-machine proper. Fig. 3 is a front elevation of the machine shown in Fig. 2. Fig. 4 is a section taken on the line $x\ x$, Fig. 2, showing the upper portion of the weighing-machine. Fig. 5 is a view similar to the upper portion of Fig. 3, but showing the parts in a different position. Figs. 6, 7, and 8 are detail views showing different positions of a latch-releasing mechanism hereinafter described. Fig. 9 is a detail view in perspective of a weighing-bucket, discharge-controlling latches, and a coöperating bucket-rapping device. Fig. 10 is a perspective view of the delivery-chute latches and immediately-connected parts.
Fig. 11 is a perspective view of the top portion of a rotating table which carries the receptacles for the weighed material. Fig. 12 is a view, principally in central vertical section, of the rotating table, showing also in section a conveying-belt. Fig. 13 is a detail view of a latch, hereinafter described, for arresting the motion of said table. Fig. 14 is a plan view of the rotating table, conveying-belt, and connected parts, certain portions being removed in order to disclose the parts beneath the same. Fig. 15 is a view in vertical section of a receiving-funnel attached to the rotating table. Fig. 16 is a diagrammatic view showing in perspective the two buckets of the weighing-machine and a portion of the series of receiving-funnels in position beneath the buckets. Fig. 17 is a sectional detail of an oscillating delivery-chute.

The material to be weighed is fed into my apparatus from a suitable bin or other source of supply, (represented in a general way by the letter A in Fig. 1 of the drawings.) This bin A is shown as provided at bottom with a spout 2, which is disconnected from but adapted to enter into a stationary chute 3, to the lower end of which is pivoted a laterally-oscillating chute 4, adapted to convey the material to be weighed to the weighing-buckets. Said chute 4 is preferably provided with a collar 5, which surrounds the end of the chute 3, the pivots 6 being screwed into said collar, as best shown in Fig. 17. The stationary chute 3 should be supported on a curved arm 7, having for its radius the distance from it to the lower extremity of the oscillating chute 4 and adjustably held in an arm 8, attached to the framework of the weighing-machine, so that the chutes 3 and 4 may be given any slant, according to the desired speed of delivery and the character of the material to be weighed. According to the construction shown in the drawings, the arm 7 is secured to the arm 8 by means of a clamping-plate 7' and screws 8', between which said arm 7 passes, being thus made capable of adjustment when the screws 8' are loosened.

The weighing-machine proper, B, is of the twin-bucket variety, the buckets being adapted to operate alternately. These buckets 9 and 10 are supported from the scale-beam 11 by means of bent arms 12 and 13 and vertical rods 14 and 15, attached thereto. Said vertical rods are provided near their upper ends with knife-blocks 16 and 17, which rest on corresponding knife-edges located in the lateral extremities of the scale-beam 11, and the scale-beam itself, which is ring-shaped, is provided with centrally-located knife-edges 18 and 19, upon which it oscillates and which rest upon knife-blocks mounted on projections 20 and 21, integral with the framework of the machine or otherwise attached thereto. The weighing-buckets 9 and 10 are guided to move in substantially vertical lines by means of a suitable number of horizontal arms 22, each pivoted at one end to a bucket and at the other end to the framework of the machine.

Weighing-weights 23 and 24 are mounted on arms 25 and 26, which are independently pivoted to the framework of the machine in such manner that each weight is directly over one of the supporting-rods of the weighing-buckets. Each of said weighing-weights is adapted to rest, when in its lowest position, on a fixed support 27 or 28, which may be formed on the framework of the machine, as shown, and when in such lowest position the corresponding arm 25 or 26 is substantially horizontal.

A rock-shaft 29 is journaled in the top part of the framework of the machine, as shown in Figs. 4 and 10, to which shaft is secured an arm 30, extending laterally in both directions just far enough to reach under the arms 25 and 26, respectively. These parts are so arranged that when the ends of the arm 30 are in a horizontal line the weighing-weights will both be supported thereby a short distance above the supports 27 and 28, thus forming a sort of balance capable of being oscillated to a limited extent in either direction. The rock-shaft 29 is also provided with two downwardly-extending arms 31 and 32, rigidly secured thereto. The arm 31 has pivoted to it two latch-arms 33 and 34, extending laterally in opposite directions and adapted to lock the rock-shaft 29 in its extreme positions, as hereinafter described. The latching action is preferably performed by stationary rollers 35 and 36, arranged to engage, respectively, with abutments 37 and 38, formed on the respective ends of the latching-arms, the excess of the distance between said abutments over the distance between said rollers determining the amount of motion which must be given to the rock-shaft to shift it from one latching position into the other. The arm 32 is provided with means for oscillating the chute 4, such as a rod 39, engaging with the slotted end of a tongue 40, which is rigidly attached to said chute.

The arms 25 and 26, which support the weighing-weights, are provided on their under surfaces, directly over the upper ends of the bucket-supporting rods 14 and 15, with knife-edges 41 and 42, against one or the other of which said rods are adapted to bear in turn when raised to a sufficient extent. In order to provide against any lateral sliding of said knife-edges on the tops of the rods 14 and 15 when those parts are raised, as hereinafter described, the pivots 43, Fig. 2, on which said arms 25 and 26 turn, are located in the same vertical plane with the knife-edges 18 and 19, upon which the scale-beam oscillates, and at a distance above said knife-edges equal to the distance between the top of one of the supporting-rods 14 and 15 and the corresponding knife-edge upon which said rod hangs. Thus when one of said supporting-rods is made to engage with and lift the corresponding weight-arm the scale-beam and those moving parts which are located above it will form in all subsequent positions a parallelogram having one of its angles at the point of contact with the top of said rod of its knife-edge 41 or 42, and therefore there can be no sliding motion at such point.

It will be seen that in a machine constructed as above described the weighing-weights perform the double function of counterbalancing the material weighed and of operating the oscillating chute 4, the operation being as follows: As one of the buckets receives the material to be weighed it descends, thereby lifting the other bucket, which is carried on the opposite end of the scale-beam until the top of the supporting-rod to which said empty bucket is attached engages with the knife-edge on the bottom of the corresponding weight-arm. The downward pressure exerted by this weight-arm with its weight, is of course the only force which tends to resist the further downward motion of the bucket which is being filled, and as soon as the latter bucket has been filled with the required amount of material the combined weight of bucket and contents acts to raise said weight off its fixed support. The immediate effect produced by this upward movement of the weight and weight-arm, and the parts below the same is the unlatching of the corresponding latch-arm 33 or 34, which result is attained, preferably, by passing said latch-arm through a slot in the corresponding bucket-supporting rod 14 or 15 in such manner that said rod will engage the bottom of the latch-arm and lift it off its roller as soon as the rod has started to move upward. As soon as this unlatching action has taken place the opposite weighing-weight, which has hitherto been supported upon one of the ends of the arm 30, as shown in Fig. 4, descends, carrying the arm 30 with it, until its motion is arrested by its fixed support, the corresponding bucket-supporting rod having moved downward out of its way. This motion of the arm 30 acts, through the rock-shaft 29 and the arm 32, to oscillate the chute 4 into position to fill the empty bucket and also throws the latch-arms over far enough to permit of the latching of the rock-shaft in its new position, in which it supports the weighing-weight that has just been raised by the descent of the filled bucket. The momentum of the moving parts may be depended upon to complete the swinging of the chute and the throwing of the latch-arms into the latching position in order that there may be a clearance between the bottom of the weighing-weight which is resting on its fixed support and the corresponding end of the arm 30. This is done in order to avoid the possibility of any upward pressure being exerted upon the weight which is in use as a weighing-weight by the contact of said arm 30 therewith.

It will be understood that the operation above set forth applies equally to each weighing-bucket and that said buckets act alternately in the weighing of the material.

My weighing-machine proper as to its parts above described resembles in many of its features the weighing-machine shown and described in Letters Patent of the United States No. 555,393, granted to me February 25, 1896.

In order to direct the stream of material into the respective weighing-buckets and to avoid spilling it in passing from one bucket to the other, I provide two stationary funnels 44 and 45, supported from the framework of the machine, one over each bucket, and having their upper edges abutting together and separated by a sharp edge 46, as shown in Fig. 4. In said figure the funnels are represented as being integral with each other. Thus when the oscillating chute 4 swings from one funnel to the other all the material which does not fall into one funnel must fall into the other, the shifting of the chute being practically instantaneous, thus not only avoiding spilling, but also adding to the accuracy of the weighing operation.

Each weighing-bucket is provided with a discharge-door 47, preferably so constructed as to be closed by its own weight. According to the construction shown in the drawings, this closing action is effected by hinging the top edge of the door to the bucket, the door being provided when necessary with an outwardly-extending weight 48. The door is adapted to be forced open by the weight of the material contained in the bucket, and in order to hold said door closed until the bucket has received its full load and has begun to descend a latch, such as 49, is provided, which, as shown in Fig. 9, is pivoted to the door and is provided with a notch 50, adapted to hook over an abutment 51, secured to the bucket and provided with a slot in which the latch slides. The latch is released, allowing the door to open by the engagement of its free end with a stop 52, secured to the framework of the machine in the path of said latch as it descends with the bucket.

It has been found in practice that substances such as named above are apt to be sluggish in discharging themselves from the weighing-machines, so that not infrequently small portions thereof remain in the buckets after the discharge-openings have been closed. In order to avoid this difficulty, I have provided each of my buckets with a device which will hold the discharge-door open until the bucket has been completely emptied and starts to rise again, thus insuring ample time for the discharge of the material. The device which I prefer to use for this purpose is best shown in Fig. 9 of the drawings, and consists of a latch 53, pivoted, as at 54, to the weighing-bucket and provided at one end with a notch 55, (best shown in Fig. 2,) which is adapted to engage, when the door is opened, with an abutment 56, secured to said door and having a slot through which said latch passes, the construction being quite similar to that of the latch 49, except that the two latches act in opposite directions. The latch 53 is released, allowing the door to close by the engaging of its free end 57 with a stop 58, secured to the framework of the machine in the path of the latch as the bucket rises.

As a further precaution against any material remaining in the buckets after their discharge by adhering to their walls, I provide each bucket with a rapping device, which acts automatically after each discharge and is preferably constructed as follows: A shaft 59 is journaled in the framework of the machine near its bottom, passing horizontally in front of both weighing-buckets. Over said shaft, in front of each bucket, is journaled on a shorter fixed shaft 60 a sleeve 61, to which is attached a hammer 62, located directly in front of its respective weighing-bucket and at a short distance therefrom. A spring 63 is secured to said sleeve and to the shaft on which it turns in such manner as to throw said hammer sharply against the bucket, except when restrained by the engaging of an arm 64 (secured to said sleeve 61) with a cam 65, secured to the shaft 59. Said cam is a spiral cam having an abrupt step 66 of such height as to allow the arm 64 when said step passes it to move toward the shaft 59 far enough to permit the hammer 62 to be thrown against the weighing-bucket. Thus for each full revolution of the shaft 59 in the direction indicated by the arrow in Fig. 9 each bucket will receive one blow from its respective hammer. Since the weighing-buckets operate alternately, the cams 65 are of course so disposed upon the shaft 59 that they also will act alternately one upon each half-revolution of said shaft. The shaft 59 is driven from any convenient source of power by means of a friction-pulley 67, which turns loosely on said shaft, but is pressed, by means of a spring 68 and sliding collar 69, against a friction-disk 70, rigidly secured to said shaft 59. Preferably a disk of leather is placed between the driving-pulley 67 and the disk 70 in order to insure sufficient frictional contact. Thus it will be seen that the shaft 59 will be driven continuously, except as it may be positively restrained. My preferred stop mechanism for arresting and releasing said shaft consists of a bell-crank lever 71, journaled on the shaft 60, and provided on one end with a friction-roller 72 or other suitable abutment, which is adapted to engage with the radial face of a cam 73, rigidly secured to the shaft 59. Said cam 73 is similar to the cam 65, except that its radial face looks in the opposite direction—i. e., in the direction of its motion. The other arm of the bell-crank lever 71 is provided with a pin 74, pivoted thereto, and so guided that its free end 75 is directly in front of the discharge-door of a bucket. Thus when said door is forced open by the discharging material it will obviously act through the medium of the pin 74 to rock the bell-crank lever 71 and release the cam 73, thus allowing the shaft 59 to turn. A similar stop mechanism is provided for each weighing-bucket, the cams 73 being so disposed on the shaft 59 as to stop said shaft at the end of each half-revolution. The members of each pair of cams 65 and 73 are so disposed with reference to each other that the releasing of the stop-cam 73 will precede the tripping action of the cam 65 by the length of time necessary to insure the discharge of the bulk of the material from the weighing-bucket.

The delivering apparatus which I prefer to use with my weighing-machine and which is represented in a general way by the letter C in the drawings comprises a horizontally-rotating table 76, provided with friction driving mechanism somewhat similar to that above described. As shown in the drawings, my table supporting and driving mechanism comprises a standard 77, in which is journaled a vertical shaft 78, adjustably supported at its lower end on a suitable bearing 79. Said shaft is provided near its upper end with a driving-pulley 80 and a friction driving-plate 81, both rigidly attached thereto. The table 76 is journaled loosely on the upper end of said shaft 78 and is provided with a friction-plate 82, which rests upon the friction driving-plate 81. A disk of leather or other suitable material 83 may be interposed between the two friction-plates, if desired, for the purpose of increasing the friction.

The cans 84 or other receptacles which are to receive the material after it has been weighed are supported upon the outer edge of the table 76 and are successively brought by the rotation thereof under the weighing-machine proper.

In order that a can may be completely filled with material without spilling, I provide a funnel attachment for each can for conducting the material into it, which attachment is preferably arranged to be automatically fitted to the top of each can and automatically disconnected therefrom respectively before and after the filling operation in order to provide for the ready placing of the cans upon and removal from the table. My preferred arrangement for this purpose is constructed as follows: A vertical rod 85 is centrally supported on the table 76 and is provided at its upper end with a hub 86, from which radiate arms 87, one for each funnel. To the outer end of each of the said arms is pivoted a bail-shaped link 88, the other ends of which are pivoted to the sides of a funnel 89, thus allowing said funnel to be moved up and down to a limited extent. The funnels may be connected together, and thus steadied and guided, if desired, by links 89ª, pivoted thereto with sufficient looseness to permit of the slight amount of play required for the upward movement of said funnels in turn. The vertical rod 85 is further provided with a second hub 90, which is also provided with radial arms 91, (one for each funnel,) each of said arms terminating in a ring 92. The lower end of each funnel is made cylindrical and provided with a circumferential shoulder 93, and around said cylindrical portion is fitted a cylindrical extension 94, which passes through one of the rings 92 into position to register with the top of a can. A loose ring 95 surrounds the cylindrical extension 94 above the fixed ring 92, said ring 95 being provided on its bottom face with equidistant rounded notches 96, preferably three in number, and upon its outer edge with twice as many equidistant projecting pins 97. Upward projections 98, also equidistant and preferably three in number, are formed on or otherwise secured to the top face of each ring 92, upon which rests the corresponding loose ring 95, the weight of the funnels being thus carried by the rings 92. A fixed stop 99, Fig. 1, is secured to the framework of the apparatus in such a position that it will be engaged by one of the pins 97 just before the corresponding funnel reaches its filling position under the weighing-machine. By this engagement of the stop and pin the loose ring 95 is given a partial rotation by the movement of the table, thus bringing its notches 96 over the projections 98 on the ring 92 and allowing the corresponding funnel to move slightly downward, thus causing the extension 94 to enter a short distance into the top of the can, a tight connection therewith being made by a washer 100, surrounding and secured to said extension near its lower end. The funnel and can retain the same relative positions throughout the subsequent rotation of the table until at any convenient point before the can is switched off upon a conveying-belt, as hereinafter described, one of the pins 97 engages a stop 101, Fig. 11, thus causing another partial rotation of the ring 95 and forcing the notches to slide up the projections 98, thus separating the funnel from the can and allowing the latter to be automatically removed from the table, as aforesaid.

It will be seen that there are only half as many projections 98 and notches 96 as there are pins 97, so that by properly locating the stops 99 and 101 with reference to said pins it will require two engagements thereof to move a given notch from one projection 98 to the next one, thus causing an alternate up-and-down motion of the ring 95 and its funnel. I prefer to employ three projections 98, because that is the least number which will afford a stable support for the rings 95 and the funnels.

The cans are set upon the table by hand and are properly positioned by means of suitable stops, such as screws 102, set into the surface of the table. Said cans may be removed from the table when filled by means of an arm 103, secured to the framework of a conveyer mechanism and projecting therefrom across the path of the cans at an angle thereto, as best shown in Fig. 14. By means of this arm 103 the cans are caused by the rotation of the table to slide off the same onto the conveyer mechanism, which may consist of an endless belt 104, passing over a pulley 105 and leading thence to whatever place may be desired, where it is of course provided with suitable driving mechanism. The pulley 105 is supported in a framework 106, which is preferably extended along the edges of the belt, projecting slightly above the same in order to keep the cans from falling off.

It is desirable that the material weighed be settled in the cans after filling the same in order that it may not spill or slop during the subsequent movements of the cans. I therefore prefer to provide a number of power-driven vertical shafts 107, each journaled in a support 108, attached to the stationary framework of the table near one of the points at which each successive pair of cans comes to rest by reason of the intermittent motion of the table, as hereinafter described. Each shaft 107 carries a hub, to which are attached a number of horizontally-radiating flexible spokes 109, preferably made of leather and so arranged that the ends of said spokes will strike the adjacent pair of cans or other receptacles while they are at rest opposite said shaft, and thereby cause sufficient vibration therein effectually to settle their contents.

In order to keep the funnels 89 free from such small portions of the substance weighed as may tend to adhere to their walls, a rapping device may be employed similar in its effect to the rapping device used in connection with the buckets of the weighing-machine proper. Said funnel-rapping device may consist of a vertical spindle 110, attached to the framework of the table, near the edge thereof, at any convenient point between the weighing-machine B and the conveyer mechanism and having journaled thereon a vertical framework 111, the upper end of which carries a resilient horizontal arm 112, provided with a hammer 113 on its free end, which hammer is normally held a short distance from the side of a funnel by means of a suitable stop, which may be provided by extending the lower end of said framework 111 sufficiently to cause it to engage with the fixed arm 114 to which the spindle 110 is attached. A spring 115 tends to hold the framework 111 against said stop. The lower portion of said framework extends under the edge of the table, where it is adapted to be successively engaged by a series of pins 116, secured to said table, whereby when the table rotates the arm 112, carrying the hammer 113, is successively thrown outward and then allowed to fly back, thus causing the hammer to rap sharply against the side of the funnel.

Inasmuch as each funnel makes a tight contact with the top of its respective receptacle while the latter is being filled, as above described, it will be seen that the only way in which the air originally contained in the receptacle is able to escape is by passing upward through the mass of material falling through said funnel. In order to avoid the "blowing" and scattering and consequent wasting of the material on account of such upward currents of air, I prefer to construct each funnel 89 in the manner best shown in Fig. 15 of the drawings, wherein the funnel is represented as provided with two partitions 117 and 118, the former dividing the lower part of the funnel vertically into two parts and the latter being located over the former in such position as to cause the falling material to pass through the funnel and into the can on one side only of the lower partition, whereby the air which was in the can is enabled to escape on the other side without having to pass through the falling material. The two partitions may obviously be combined into one, if desired.

In those machines of this class which employ a twin-bucket weighing-machine proper it has been customary hitherto to cause each of the weighing-buckets to discharge into a common stationary funnel, through which the material passes into suitable funnels or receptacles supported by and moving with the rotating table, which is rotated step by step, advancing one receptacle at a time. On account of the adhesive tendencies of the substances which this present machine is more particularly intended to handle, as hereinbefore set forth, the provision of a stationary funnel through which both buckets of the weighing-machine must discharge into the funnels on the rotating table would be objectionable, since it would furnish an additional receptacle to the walls of which the material would tend to adhere and from which it would have to be dislodged. I therefore provide means whereby my table is intermittently rotated two steps at a time—that is to say, in such manner as to present two empty receptacles at once to the two buckets of the weighing-machine proper, each of which thus may discharge directly into its appropriate funnel and connected receptacle on the table.

The arresting and releasing mechanism for the table 76 may consist of a latch 119, pivoted to the framework of the table below the weighing-machine proper and arranged to engage successively at one of its ends with each one of a number of stops 120, attached to the table and separated from each other by a distance equal to twice the distance between two successive cans 84. The arm 121, which operates the latch 119, is connected by means of a rod or wire 122 to a latch-operating mechanism preferably constructed as follows: The shaft 59, which operates the bucket-rapping mechanism hereinbefore described, is provided at one end with a crank 123, to which is pivoted a connecting-rod 124, provided near its free end with a hook 125 on its bottom edge, as best shown in Figs. 2, 6, 7, and 8. A bell-crank lever 126 is pivoted, as at 127, to the base of the weighing-machine proper, and to the free end of its horizontal arm 128 is attached the rod or wire 122 above described. The other arm 129 of the bell-crank lever 126 extends upwardly and is provided at its upper end with two laterally-extending pins 130 and 131. The free end of the connecting-rod 124 rests at all times upon one or the other of said pins and is held by means of their upwardly-projecting ends from slipping off said pins laterally.

The operation of the mechanism just described is as follows: Supposing the parts to be in the position shown in Figs. 2 and 6, the discharge of that weighing-bucket of which the stop-cam is in the locked position will release the shaft 59 and permit the same to make a half-revolution, as hereinbefore explained, thus moving the connecting-rod 124 to the left to the limit of its motion in that direction and causing the hook 125 to slide over and pass beyond both pins 130 and 131, the parts being thus brought into the position shown in Fig. 7. Upon the discharge of the other weighing-bucket the shaft 59 will be again released and will make another half-revolution, thereby causing the connecting-rod 124 to move to the right to the limit of its motion in that direction, in and by which motion the hook 125 will be made to engage with the pin 131, and thereby actuate the bell-crank lever 126 and release the table-latch 119. As the connecting-rod 124 approaches the end of its movement to the right, the parts being then in the position shown in Fig. 8, the pin 130 will strike against the edge of the rod 124 and will act to lift the same until its hook 125 has been disengaged from the pin 131, whereupon the weight of the horizontal arms 121 and 128 will cause the latch 119 to assume its locking position, which it will reach before the table has been sufficiently rotated to present another stop 120 at the place of engagement with said latch. From the above description it will be clear that the table-latch 119 will be operated only upon each second discharge of the weighing-machine proper and that each movement of the table will carry it through the space occupied by two of the receptacles which it carries, thereby presenting two empty receptacles at once under the two buckets of the weighing-machine in position to be filled one after the other, and thus dispensing with an intermediate stationary funnel.

An important feature of my table-releasing mechanism, which I believe to be broadly new, lies in the provision of power-driven mechanism for operating the table-latch, said mechanism being itself set in motion by the operation of the weighing-machine proper. The amount of power required to rotate the table is of necessity considerable, and therefore the frictional resistance to the operation of its latch will in many cases be greater than could conveniently be overcome by the small amount of force exerted by the discharge of a weighing-bucket or other operation of the weighing-machine proper; but by providing a power-driven device for operating the table-latch, said device itself being easily set in motion by an operation of the weighing-machine, the above difficulty is wholly obviated, and the apparatus may be made to weigh and deliver small amounts of material with great accuracy.

Although my weighing apparatus is more particulary intended to be used for the weighing of materials of the kinds above specified, it is of course capable of being used with good results in connection with other materials. Furthermore, I do not consider my invention to be limited to the specific mechanism herein shown and described, as that mechanism may obviously be varied in many ways without departing from my invention.

I claim as my invention—

1. In an automatic weighing-machine, the combination of a delivery-spout adjustable in a vertical, circular arc, an oscillating chute pivoted to said spout in such manner as to swing laterally, and means for oscillating said chute.

2. In an automatic weighing-machine, the combination of a delivery-spout adjustable in a vertical, circular arc, an oscillating chute provided with a collar surrounding the end of said spout and pivoted thereto to swing laterally, and means for oscillating said chute.

3. In an automatic weighing-machine, the combination with a weighing-bucket of means operative upon the discharge of said bucket for rapping the walls thereof, whereby it is freed from adhering portions of the substance weighed.

4. In an automatic weighing-machine, the combination with a weighing-bucket of means operative upon the discharge of said bucket for rapping the same, said means being actuated by power not derived from the mass of the material weighed, for the purpose set forth.

5. In an automatic weighing-machine, the combination of a weighing-bucket, a bucket-rapper, mechanism constantly tending to operate said rapper, and means operative with the weighing mechanism for releasing said rapper-operating mechanism.

6. In an automatic weighing-machine, the combination of a weighing-bucket having a discharge-opening normally closed by a door, a bucket-rapper, mechanism constantly tending to operate said rapper, and means actuated by the opening of said door for releasing said rapper-operating mechanism.

7. In an automatic weighing-machine, the combination of a weighing-bucket having a discharge-opening normally closed by a door, a bucket-rapper, a shaft provided with a stop-latch and with means for operating said rapper, driving mechanism tending to rotate said shaft, and a contact-piece adapted to be engaged by said door when it opens, whereby said stop-latch is released.

8. In an automatic weighing-machine, the combination of a weighing-bucket provided with a discharge-door, means unconnected with the door operative upon the discharge of said bucket for rapping the same, a latch arranged to lock said door open, and means for releasing said latch after the operation of the bucket-rapping device.

9. In an automatic weighing-machine, the combination of a weighing-bucket provided with a discharge-door, a bucket-rapper, mechanism constantly tending to operate said rapper, means actuated by the opening of said door for releasing the rapper-operating mechanism, a latch arranged to lock said door open during the operation of the rapping mechanism, and means for releasing said latch upon the upward movement of said bucket.

10. In an automatic weighing apparatus, a delivery-funnel adapted to be fitted to the top of a receptacle and provided with two interior partitions, one above the other, the upper partition being arranged to direct the falling material to one side only of the lower partition.

11. In an automatic weighing apparatus, a vertically-movable funnel arranged to be fitted at its lower end to the top of a stationary receptacle and to be supported thereby when lowered, and means for automatically raising and lowering said funnel.

12. In an automatic weighing apparatus, a rotating table, a vertically-movable funnel carried by said table and arranged to be fitted at its lower end to the top of a receptacle, means for lowering said funnel, and means for raising said funnel while its receptacle is being removed from said table.

13. In an automatic weighing apparatus, a rotating table, a series of funnels carried thereby, each funnel being capable of an independent vertical movement and being adapted to be fitted at its lower end to the top of a receptacle, means for lowering said funnels successively before their respective receptacles have been filled with weighed material, and means for raising said funnels successively before the respective filled receptacles have reached the position of removal from said table.

14. In an automatic weighing apparatus, a vertically-movable funnel adapted to be fitted at its lower end to the top of a receptacle, a guiding-ring through which the lower portion of said funnel passes, a series of projections on the top face of said ring, and a collar resting upon said projections and carrying the weight of the funnel, said collar being notched on its bottom face and provided with means whereby it may be partially rotated before and after the filling of the receptacle.

15. In an automatic weighing apparatus, the combination with a rotating table, of a vertically-movable funnel carried thereby, a collar secured to said funnel at its lower end and provided with means whereby it may be fitted to the top of a can or other receptacle, a fixed guiding-ring through which said collar passes and which has a series of projections on its top face, a loose notched ring resting on said projections and carrying the weight of the funnel, a series of pins secured to said loose ring, and fixed stops with which said pins engage upon the rotation of the table, for the purpose set forth.

16. In an automatic weighing apparatus, the combination with a rotating table adapted to carry on its circumference a series of cans or other receptacles, of a central, vertical rod secured to said table and provided with two hubs, one above the other, a series of fixed arms radiating from the top hub, each provided at its outer end with a pivoted arm to which a funnel is pivoted, a corresponding series of radiating arms secured to the lower hub, each provided at its outer end with a fixed guiding-ring for the corresponding funnel, two stops secured to the framework of the rotating table, and means arranged to engage said stops successively and to be actuated thereby to raise and lower said funnels in turn.

17. In an automatic weighing apparatus, a rotating table adapted to turn loosely on a vertical shaft and provided with a friction-plate, means for rotating said shaft, a second friction-plate secured to said shaft and arranged to receive the weight of the first friction-plate and the table, and a stop mechanism for arresting the motion of said table at predetermined intervals.

18. In an automatic weighing apparatus, the combination of a rotating table, a series of delivery-funnels carried thereby, a stationary spring-actuated hammer located adjacent to said table, and means for tripping said hammer as each funnel in turn moves past it, for the purpose set forth.

19. In an automatic weighing apparatus, the combination with a rotating table carrying a series of funnels, of a vertical spindle secured to the framework of said table adjacent to the edge thereof, a framework journaled on said spindle and having its lower end projected under the table into position to be engaged by a series of pins secured thereto, a flexible arm secured to the upper end of said framework and carrying a hammer at its free end, and means for actuating said framework after it has been tripped by one of said pins.

20. In an automatic weighing apparatus, the combination of a rotating table, means for driving the same, power-driven mechanism for setting said table-driving means in motion, and means operative with the weighing mechanism for causing said power-driven mechanism to operate.

21. In an automatic weighing apparatus, the combination of a rotating table, means for driving the same, an arresting device normally holding the table at rest, power-driven mechanism for actuating said table-arresting device, and means operative with a discharge from the weighing mechanism for setting in motion said power-driven mechanism.

22. In an automatic weighing apparatus, the combination of a rotating table supported on a friction driving-plate, a latch normally arresting the motion of said table, and latch-operating mechanism actuated by the discharge of a weighing-bucket.

23. In an automatic weighing apparatus, the combination of a rotating table, means constantly tending to drive the same, a latch normally arresting the motion of said table, means constantly tending to release said latch, and means arranged to be actuated by the discharge of a weighing-bucket for releasing said latch-releasing means.

24. In an automatic weighing apparatus, in combination with a rotating table, a shaft, friction driving mechanism therefor, a stop normally arresting the motion thereof, means arranged to be operated by the discharge of a weighing-bucket for releasing said shaft, a crank secured to said shaft and having a connecting-rod pivoted thereto, a hook at the free end of said rod adapted to engage with and operate a bell-crank lever, means for automatically releasing said hook from said lever near the end of a stroke, and means connected with said bell-crank lever for arresting and releasing the rotating table.

25. In an automatic weighing apparatus, a latch-releasing mechanism comprising a positively-driven shaft provided with a crank, a rod pivoted to said crank and having a hook near its free end, and a bell-crank lever connected to the latch and having an upright arm provided with two pins arranged to engage said hook, substantially as described.

26. In an automatic weighing apparatus, the combination with a weighing-machine proper having two alternately-operating weighing-buckets, of a rotating table arranged to carry a series of receptacles for the material weighed, and means for operating said table to present simultaneously one empty receptacle under each of said weighing-buckets.

27. In an automatic weighing apparatus, the combination with a weighing-machine proper having two weighing-buckets, of a table arranged to carry a series of receptacles for the material weighed, means constantly tending to rotate said table, a latch adapted to arrest the motion of the table at intervals sufficient for the movement of the table through the space occupied by two receptacles, and means for tripping said latch at every second discharge of material from the weighing-machine proper.

28. In an automatic weighing apparatus, the combination with a weighing-machine proper having two weighing-buckets, of a rotating table, driving mechanism therefor, a series of stops secured to said table at intervals equal to the distance between the centers of two successive receptacles for the material weighed, a latch for engaging said stops, and means operative after two discharges from the weighing-buckets for releasing said latch.

29. In an automatic weighing apparatus, the combination of a shaft, friction driving mechanism therefor, two stop-cams secured to said shaft and arranged to operate alternately, one at the end of each half-revolution of the shaft, means for releasing said cams successively upon each discharge of a weighing-bucket, bucket-rapping mechanism operated by said shaft, and means actuated by each full revolution of said shaft for operating a table-latch.

In testimony whereof I have hereunto subscribed my name this 27th day of December, 1898.

WILLIAM EMERY NICKERSON.

Witnesses:
  E. D. CHADWICK,
  GEORGE CLARENDEN HOOFER.